United States Patent
Ayneto Pou et al.

(10) Patent No.: US 9,945,255 B2
(45) Date of Patent: Apr. 17, 2018

(54) STRUCTURAL MEMBER FOR A WIND TURBINE

(71) Applicant: ALSTOM RENEWABLE TECHNOLOGIES, Grenoble (FR)

(72) Inventors: Jordi Ayneto Pou, Premia de Dalt (ES); Josep Bosch Collado, Caldes de Montbui (ES)

(73) Assignee: GE Renewable Technologies Wind B.V., Breda (NL)

( * ) Notice: Subject to any disclaimer, the term of this patent is extended or adjusted under 35 U.S.C. 154(b) by 231 days.

(21) Appl. No.: 14/893,023

(22) PCT Filed: May 23, 2014

(86) PCT No.: PCT/EP2014/060649
§ 371 (c)(1),
(2) Date: Nov. 20, 2015

(87) PCT Pub. No.: WO2014/187949
PCT Pub. Date: Nov. 27, 2014

(65) Prior Publication Data
US 2016/0131112 A1    May 12, 2016

(30) Foreign Application Priority Data

May 24, 2013 (EP) .................... 13382193

(51) Int. Cl.
*F03D 80/00* (2016.01)
*F01D 25/24* (2006.01)
(Continued)

(52) U.S. Cl.
CPC .............. *F01D 25/24* (2013.01); *F03D 11/04* (2013.01); *F03D 13/20* (2016.05); *F03D 80/00* (2016.05);
(Continued)

(58) Field of Classification Search
CPC .......... F03D 80/00; F03D 80/70; F03D 80/80; F03D 1/0608; F03D 1/065; F03D 13/20;
(Continued)

(56) References Cited

U.S. PATENT DOCUMENTS

| | | | |
|---|---|---|---|
| 7,118,339 B2 | 10/2006 | Moroz et al. | |
| 8,240,990 B2 | 8/2012 | Kammer et al. | |
| 9,297,363 B2 * | 3/2016 | Guerenbourg | ...... F03D 11/0008 |

FOREIGN PATENT DOCUMENTS

| | | |
|---|---|---|
| DE | 10255745 | 6/2004 |
| DE | 102008046210 | 3/2010 |

(Continued)

OTHER PUBLICATIONS

DE 102008046210—Original and translation from Espacenet.*
International Search Report and Written Opinion for PCT2014/060649, dated Jun. 25, 2014, 10 pgs.

*Primary Examiner* — Woody Lee, Jr.
*Assistant Examiner* — Behnoush Haghighian
(74) *Attorney, Agent, or Firm* — Dority & Manning, P.A.

(57) ABSTRACT

It comprises a body that has an inertial asymmetrical and/or the body is asymmetrical in terms of geometry and/or mass of with respect to a XZ plane passing substantially through the centre of a wind turbine rotor for withstanding asymmetrical loads acting on the wind turbine. The inertia in sections of the structural member body at one side of the XZ plane may be 50% greater than the inertia in sections of the structural member body at another side of the XZ plane. The structural member may connect the wind turbine tower with the wind turbine rotor and may comprise at least two asymmetrical portions defined on both sides of the XZ plane which may be mutually asymmetrical reinforcing elements.

7 Claims, 4 Drawing Sheets

(51) Int. Cl.
*F03D 80/70* (2016.01)
*F03D 13/20* (2016.01)
*F03D 11/04* (2006.01)
*F03D 1/06* (2006.01)

(52) U.S. Cl.
CPC .............. *F03D 80/70* (2016.05); *F03D 1/065* (2013.01); *F03D 1/0608* (2013.01); *F05B 2240/14* (2013.01); *Y02E 10/726* (2013.01); *Y02E 10/728* (2013.01)

(58) Field of Classification Search
CPC F03D 11/04; F05B 2240/14; F05B 2240/912; F05B 2240/913
USPC .............................. 416/244 R, 244 A, DIG. 6
See application file for complete search history.

(56) References Cited

FOREIGN PATENT DOCUMENTS

| | | | | |
|---|---|---|---|---|
| DE | 102008046210 A1 * | 3/2010 | ............. | F03D 80/00 |
| EP | 1291521 | 3/2003 | | |
| EP | 1291521 A1 * | 3/2003 | ........... | F03D 7/0268 |
| WO | WO2005010358 | 2/2005 | | |
| WO | WO2008087180 | 7/2008 | | |
| WO | WO2010044380 | 4/2010 | | |
| WO | WO2011003482 | 1/2011 | | |

* cited by examiner

STRUCTURAL MEMBER FOR A WIND TURBINE

A structural member, such as for example, a connecting member for attaching a wind turbine tower with a wind turbine rotor, is disclosed herein.

BACKGROUND

A number of components in wind turbines, such as the rotor, the nacelle or the tower, are usually subjected to asymmetric loads. Asymmetric loads are produced due to variable conditions of the wind and add to the action of the vertical and/or horizontal wind loads as well as loads caused by the rotor when in operation. Asymmetric loads result in fatigue damage on the turbine structure. This is highly relevant in current wind turbine structures due to their great overall size with increasingly larger blade spans. This in practice results in a shorter lifetime and/or a more frequent maintenance of at least the above mentioned wind turbine components.

It is known in the art to use asymmetric load control means. Such control means perform, based on the asymmetric loads, a cyclic actuation on the wind turbine blade pitch system to control the aerodynamic rotational torque of the rotor. This can be carried out, for example, through a PID controller to reduce or mitigate the effect of the asymmetric loads acting on the wind turbine components. Such asymmetric load control means include measuring means for measuring displacements or deflections of certain elements of the wind turbine. Known measuring means in this field are, for example, sensors placed at the root of the blades or sensor means adapted for measuring deflections in the wind turbine low speed shaft. This is disclosed, for example, in documents WO2005010358 and WO2008087180.

The main disadvantage of the use of the above mentioned control means is that the displacements to be measured in certain elements of the wind turbine are usually very small. In addition, it has been found that the measured displacements may be caused by other loads apart from asymmetric loads.

As a further example, document U.S. Pat. No. 8,240,990 provides time based correction of the initial conditions during shutdown for reducing asymmetric loads on wind turbine components. The method disclosed comprises calculating a time delay for pitching each blade toward feather upon initiation of a shutdown condition. According to each blade angle, a blade is moved toward feather with an initial or final pitch rate until all the blades have reached approximately an identical blade angle. The blades are then moved simultaneously together to feather at the final pitch rate.

It has been however shown that the pitch control may not be capable of reducing harmonic loads caused by asymmetric loads on the structure. For this reason, the prior art has also tried to use methods for reducing asymmetric loads without adjusting pitch are known. For example, document U.S. Pat. No. 7,118,339 discloses a method for reducing loads in a wind turbine having a rated wind speed. The method consists in operating the wind turbine above a selected wind speed and introducing a yaw error.

The above prior art methods penalise energy production so there is still the need for a more efficient strategy to at least mitigate the increased loads on a wind turbine structure at reduced costs while still maintaining the power produced at a desired level.

SUMMARY

A structural member for a wind turbine is disclosed, the wind turbine comprising a tower and a nacelle having a rotor. The structural member comprises a body that is asymmetrical with respect to an XZ plane passing substantially through the center of the wind turbine rotor for withstanding asymmetrical loads acting on the wind turbine. It has been found that at least the above disadvantages relating to the prior art solutions are advantageously mitigated with this structural member. A wind turbine incorporating the feature of the invention is also disclosed herein.

A wind turbine includes a tower, a nacelle rotatably disposed at the top of the tower through a yaw bearing assembly which is coupled to a frame in the nacelle. The wind turbine further includes a rotor that is operatively connected to a generator arranged inside the nacelle. The rotor of the wind turbine includes a central hub rotatably mounted on the nacelle and a plurality of blades, such as three, attached to the central hub and projecting radially outwardly therefrom. The blades transform mechanical energy of the wind into a mechanical rotational torque that drives the generator via the rotor.

The present structural member may be any structural member in the wind turbine, such as a body connecting the wind turbine tower with the wind turbine rotor, the frame of the wind turbine nacelle or even the tower of the wind turbine itself. In any case, the structural member comprises a body having a design that is asymmetrical with respect to a XZ plane passing through the centre of the wind turbine rotor. The asymmetry of the design of the structural member body is suitable for withstanding asymmetrical loads acting on the wind turbine.

The asymmetric structural design of the structural member takes advantage of the asymmetric nature of fatigue loads in the XZ plane acting on the wind turbine components and provides significantly beneficial load shares tailored for particularly critical interfacing components. It will be however understood that the present asymmetric structural member takes advantage in general of the asymmetric nature of any kind of loads, such as extreme loads, acting on the wind turbine components.

Within the meaning of the present disclosure, the XZ plane is a substantially vertical plane of symmetry of the rotor passing substantially through its centre, or in some cases it may be a plane of symmetry of the nacelle of the wind turbine.

The present structural member is not limited to any particular part of the wind turbine, but optimum shapes according to an asymmetric structural design may be applied to frames, structures, etc.

In some examples, the structural member body may be inertially asymmetrical with respect to said XZ plane. Yet in some examples, the structural member body may be asymmetrical in terms of geometry or in terms of mass. High material utilization ratio and optimal stiffness distributions may be achieved for every area of the body.

In one example, the inertia in sections of the body at one side of the XZ plane is substantially 50% greater than the inertia in sections of said body at another side of the XZ plane.

The structural member body may be a body connecting the wind turbine tower with the wind turbine rotor. In some cases, the structural member body may be the frame of the wind turbine nacelle that is arranged inside of it.

In some examples, the structural member body may comprise at least two asymmetrical portions defined on both sides of the XZ plane. Such at least two asymmetrical portions include mutually asymmetrical reinforcing elements. As stated above, the predominant inertia of a reinforcing element in one of said asymmetrical portions may be in a first plane while the predominant inertia of the other reinforcing element in the another of the asymmetrical portions may be in a different, second plane.

In some examples, the structural member body may comprise a base portion associated with the wind turbine tower. The structural member body may further comprise a vertical portion to be associated with an intermediate frame of the wind turbine. Both the base portion and the vertical portion are attached to each other by means of the reinforcing elements.

Yet in some examples, the structural member body may comprise a base portion associated with the wind turbine tower. The structural member body may further comprise a vertical portion to be associated with a main bearing of the wind turbine. Both the base portion and the vertical portion are attached to each other by means of the reinforcing elements.

It is preferred that, within the present asymmetric design of the structural member, the structural member body comprises a number of mass reduction portions. The mass reduction portions may be formed, for example, in a base portion of the structural member. The distribution of such mass reduction portions may be carried out taking into account the asymmetry of the structural member.

A wind turbine is also disclosed herein. The wind turbine mainly comprises a wind turbine tower and a wind turbine nacelle. The nacelle has a rotor rotatably mounted therein. The above defined structural member is also provided for connecting the tower with the rotor frame. The structural member may be for example the frame of the nacelle fitted inside of it.

The main advantage the above topological construction and design is that a decrease in the use of materials, weight and cost as well as an increase in the overall structural performance with regards to global stiffness is advantageously achieved. This strategic design involves a great topological optimization of structural parts of the wind turbine dispensing with unnecessary symmetry used in the prior art wind turbine parts. In current standard prior art symmetric components, although the torque to be transformed into electrical power mostly affects the structure in a single direction, the asymmetry of the loads acting on the wind turbine parts results in that the wind turbine components have one side unnecessarily oversized with respect to the other side.

With the present solution, for example, the stiffness resulting from the design of the wind turbine central frame does not adversely affect the structural behaviour of the yaw bearing, for example. Therefore, redesign of such components for higher strength is no longer needed at the very end of the design process for rendering it bigger, stiffer and heavier. The minimum pair of contact forces and contact angles in wind turbines parts such as the bearing rolling elements results in significant cost savings and weight reduction.

Additional objects, advantages and features of examples of the present wind turbine structural member will become apparent to those skilled in the art upon examination of the description, or may be learned by practice of the present disclosure.

BRIEF DESCRIPTION OF THE DRAWINGS

Particular examples of the present wind turbine structural member will be described in the following by way of a non-limiting example, with reference to the appended drawings, in which:

FIG. 5 is a bottom view of the structural member shown in FIGS. 4 and 4a; and

DETAILED DESCRIPTION OF EXAMPLES

One possible example of the present structural member for a wind turbine 200 is disclosed herein and shown in the FIGS. 1-6 of the drawings.

Figure 1:
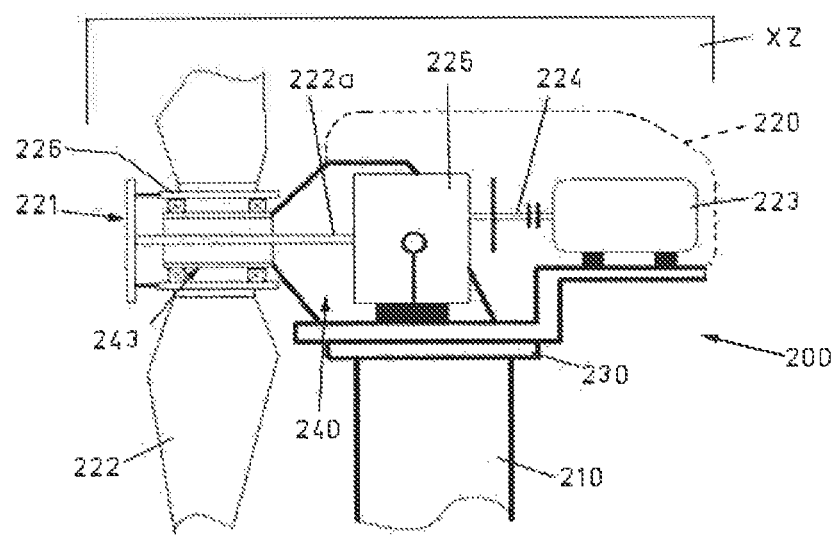
FIG. 1 is a schematic elevational part view of a wind turbine in which a nacelle, a rotor and a tower top portion are shown.
Figure 2:
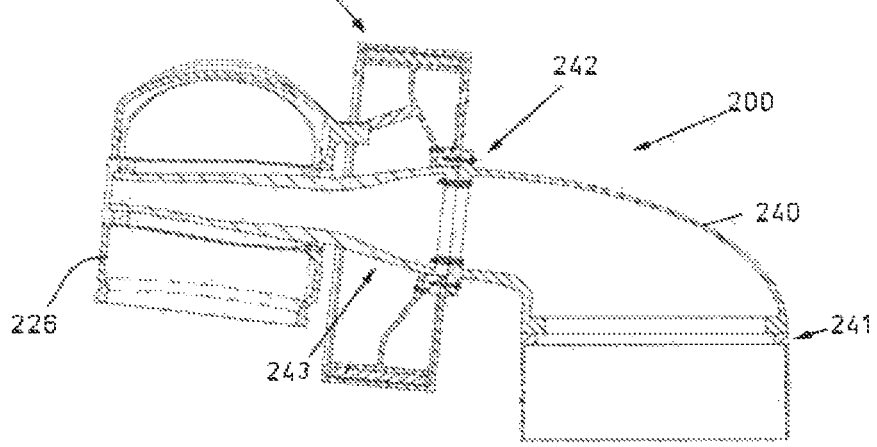
FIG. 2 is a schematic elevational part view of a direct drive wind turbine.
Figure 3:
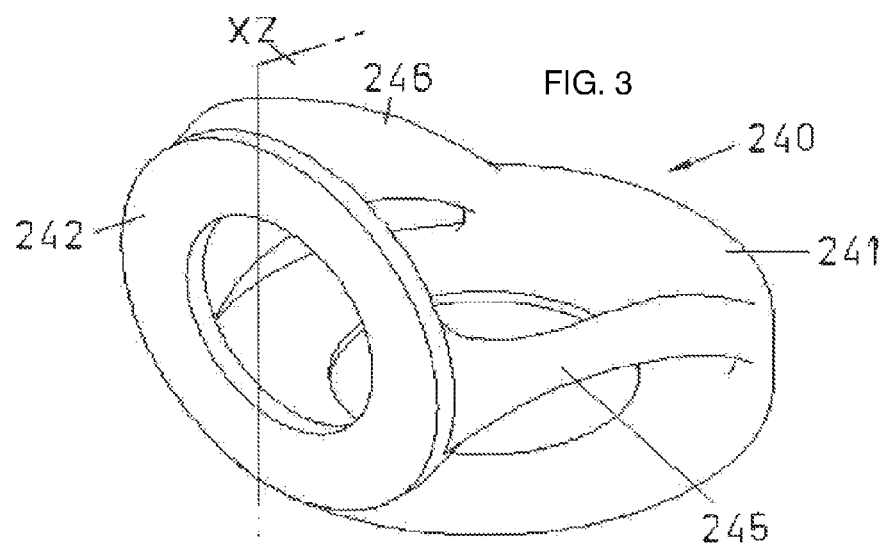
FIG. 3 is a perspective view of one example the present structural member.
Figure 3A:
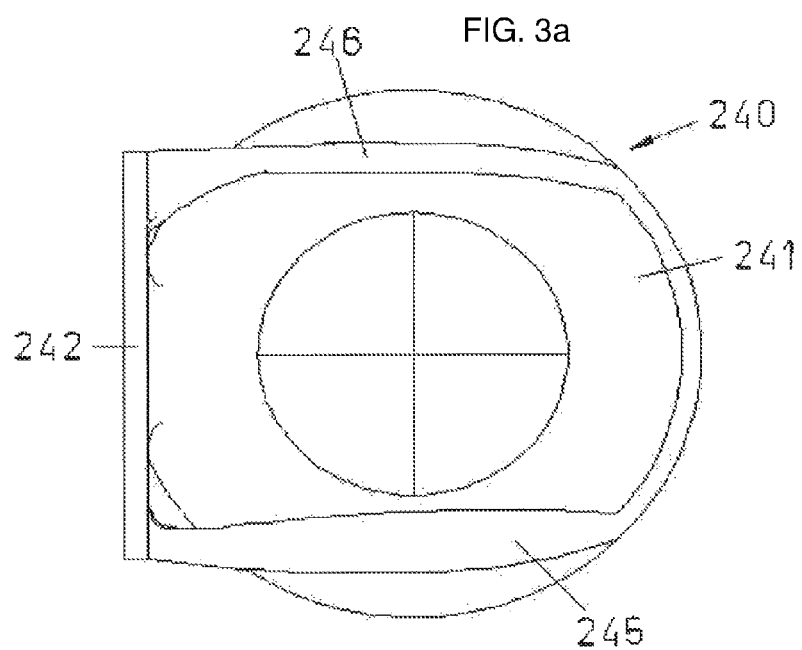
FIG. 3a is a top plan view of the structural member shown in FIG. 3.

FIG. 1 is a schematic elevational part view of one example of a wind turbine 200 to which the present structural member is applied as a non-limiting example. The wind turbine 200 includes a tower 210 and a nacelle 220 that is rotatably disposed at the top of the tower 210. The nacelle 220 comprises a frame 240 and a rotor 221.

The rotor 221 comprises a plurality of blades 222, such as three, attached a central hub 226 that is rotatably mounted on the nacelle 220. The blades 222 are disposed projecting radially outwardly from the central hub 226 and connected to a rotor shaft 222a. The rotor shaft 222a acts as a low speed shaft and drives a high speed shaft 224 via a gearbox 225 which in turn drives a generator 223 arranged inside the nacelle through the high speed shaft 224. A yaw bearing assembly 230 is disposed between the top of the tower 210 and the frame 240 of the nacelle 220.

The frame 240 is a structure arranged within the nacelle 220 comprising a front frame 243 attached thereto for supporting the rotor 221. The frame 240 can be rotated relative to the tower 210 through the yaw bearing assembly 230. In operation, loads are transferred through the frame 240. The frame 240 can be made of a single part or it can be made of multiple parts, as required. The central hub 226 is connected to the nacelle 220 through the frame 240 such that the central hub 226 is allowed to rotate about an axis. In some cases, the central hub 226 may be supported through a bearing. In any case, the nacelle 220 does not have any structural function and only serves for housing purposes.

In the present example, the structural member is the frame 240 connecting the wind turbine tower 210 with the wind turbine rotor 221. As shown in FIGS. 3-6 of the drawings, the structural member 240 comprises a body that is asymmetrical with respect to a XZ plane passing substantially through the centre of the wind turbine rotor 221. The XZ plane is a substantially vertical plane of symmetry of the rotor 221 but in some cases it may correspond to a plane of symmetry of the nacelle 220 itself The asymmetry of the structural member 240 may be measured inertially or in terms of mass, suitable for withstanding asymmetrical loads acting on the wind turbine 200.

Referring again to FIGS. 3-6 of the drawings, the asymmetrical structural member 240 comprises a base portion 241, a vertical portion 242 and side portions 245, 246. The base portion 241 of the asymmetrical structural member 240 connects the top of the tower 210 with the nacelle 220 while the vertical portion 242 of the asymmetrical structural member 240 connects the nacelle 220 with an intermediate frame of the wind turbine 200 or with the front frame 243 or with the central hub 226 trough the main bearing.

Figure 4:
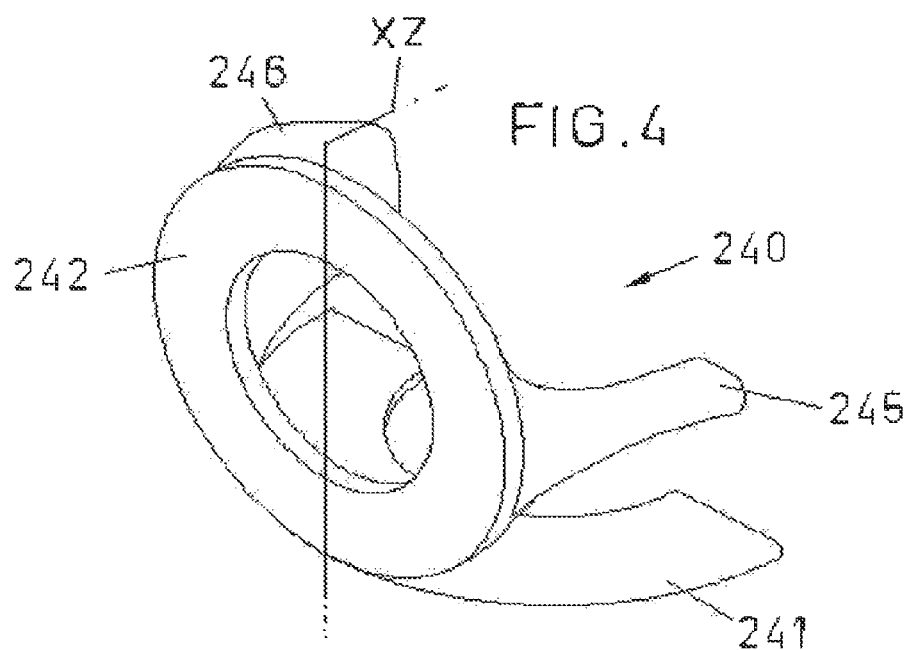
FIG. 4 is a perspective view of the structural member shown in FIGS. 3 and 3a, with the structural member partially sectioned by a substantially vertical plane.
Figure 4A:
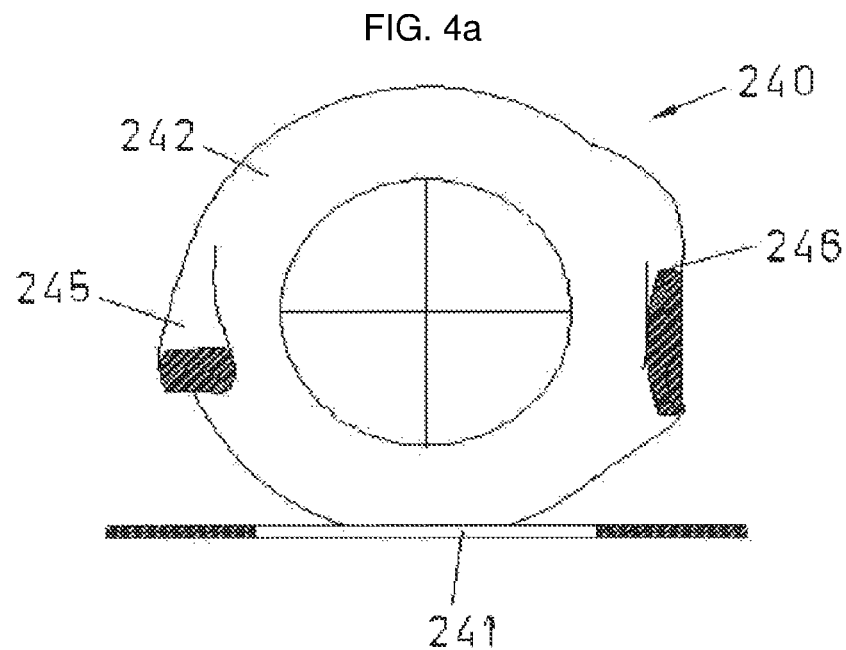
FIG. 4a is a rear side view of the structural member shown in FIG. 4.
Figure 5:
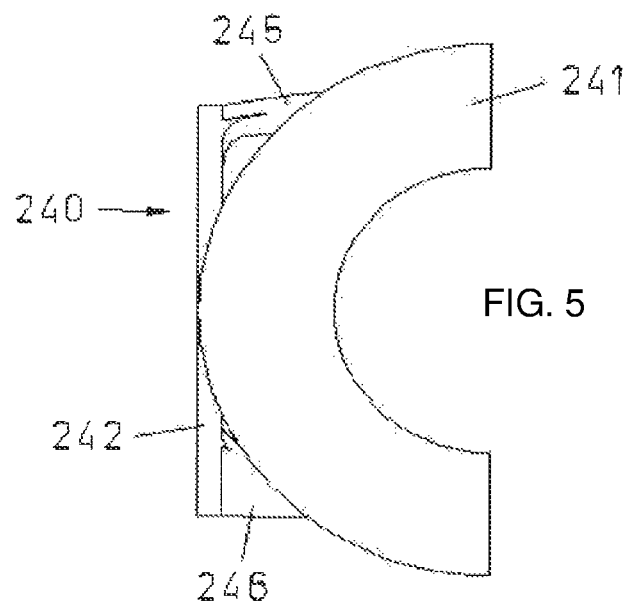
Figure 6:
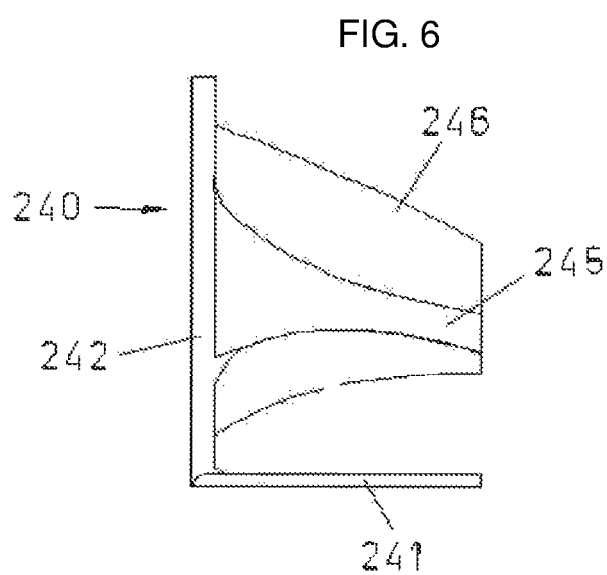
FIG. 6 is an elevational view of the structural member shown in FIGS. 4, 4a, and 5.

FIG. 4a, which is a rear side view of the structural member 240 clearly shows the asymmetry through the different side portions 245, 246 as sectioned by a substantially vertical plane. As it can be seen, the resulting section on each sideportion 245, 246 is quite different, e.g. about 50%, resulting in the inertial asymmetry of the whole structural member body 240 with respect to the XZ plane.

The side portions 245, 246 of the asymmetrical structural member 240 are on both sides of the XZ plane. The side portions 245, 246 include mutually asymmetrical reinforcing elements as shown in the FIGS. 3-6 of the drawings. The asymmetrical reinforcing elements 245, 246 attach the base portion 241 with the vertical portion 242 of the structural member 240.

The side portions 245, 246 of the asymmetrical structural member 240 are different, asymmetric, in terms of shapes and/or in terms of mass distribution. For example, one side portion 245 may be almost 10% lighter than the other side portion 246. This results in redistributed loads to the yaw bearing 230 which in turn results in 20% reduction of maximum loads in the rolling elements.

The design of asymmetrical side portions 245, 246 on both sides of the XZ plane in the present structural member 240 is a topological optimization of wind turbine structural parts dispensing with unnecessary symmetry used so far.

Although only a number of particular examples and examples of the wind turbine structural member have been disclosed herein, it will be understood by those skilled in the art that other alternative examples and/or uses thereof and obvious modifications and equivalents thereof are possible.

The present disclosure covers all possible combinations of the particular examples described. Reference signs related to drawings and placed in parentheses in a claim, are solely for attempting to increase the intelligibility of the claim, and shall not be construed as limiting the scope of the claim. Thus, the scope of the present disclosure should not be limited by particular examples, but should be determined only by a fair reading of the claims that follow.

The invention claimed is:

1. A structural member for use in a wind turbine, that has a tower and a nacelle having a rotor, the structural member comprising a body, wherein the body comprises an asymmetrical weight distribution with respect to a vertical XZ plane passing substantially through the center of the wind turbine rotor and aligned with an axis of rotation of the wind turbine rotor for withstanding asymmetrical loads acting on the wind turbine, the structural member comprising a base portin configured to connect the nacelle with the tower and a vertical portion configured to connect with the wind turbine rotor, the asymmetrical weight distribution relative to the XZ plane being such that inertia of the structural member is asymmetric with respect to the XZ plane.

2. The structural member as claimed in claim 1, wherein the structural member body comprises one or both of an asymmetrical geometry or different materials with respect to the XZ plane that produces the weight distribution.

3. The structural member as claimed in claim 1, wherein the inertia of the structural member body at one side of the XZ plane is substantially 50% greater than the inertia of the structural member body at an oppsite side of the XZ plane.

4. The structural member as claimed in claim 1, wherein the structural member body comprises comprises a reinforcement element at each side of the XZ plane, the reinforcing elements extending between the base portion and the vertical portion and having different configurations that provide the asymmetric weight distribution of the body relative to the XZ plane.

5. The structural member as claimed in claim 4, wherein the vertical portion is configured to connect with an intermediate frame of the wind turbine.

6. The structural member as claimed in claim 4, wherein the vertical portion is configured to connect with a main bearing of the wind turbine.

7. A wind turbine comprising a tower and a nacelle having a rotor, wherein the wind turbine further comprises the structural member as claimed in claim 1 for connecting the tower with the nacelle and connecting the rotor with the nacelle.

* * * * *